US 6,335,100 B1

(12) United States Patent
Tominaga et al.

(10) Patent No.: US 6,335,100 B1
(45) Date of Patent: *Jan. 1, 2002

(54) STRUCTURAL MATERIAL AND PROCESS FOR ITS PRODUCTION

(75) Inventors: Ichiro Tominaga, Kobe; Taketo Matsuki; Tetsuo Yamaguchi, both of Nishinomiya; Hiroomi Matsushita, Osaka; Kunio Niwa, Nishinomiya, all of (JP)

(73) Assignee: Sumitomo Rubber Industries, Ltd., Kobe (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 07/952,137

(22) Filed: Sep. 28, 1992

Related U.S. Application Data

(63) Continuation of application No. 07/403,263, filed on Sep. 5, 1989, now abandoned, which is a continuation-in-part of application No. 07/019,981, filed on Mar. 30, 1987, now abandoned.

(30) Foreign Application Priority Data

May 31, 1985 (JP) .......................................... 60-119120
Nov. 2, 1985 (JP) .......................................... 60-246542

(51) Int. Cl.[7] ............................................... B32B 5/16
(52) U.S. Cl. .................... 428/474.4; 428/364; 428/375; 156/275.5
(58) Field of Search ................................ 428/224, 288, 428/474.4; 156/275.5

(56) References Cited

U.S. PATENT DOCUMENTS 4,356,228 A * 10/1982 Kobayashi et al. ......... 428/902
4,528,223 A * 7/1985 Kumazawa et al. ....... 428/34.5

FOREIGN PATENT DOCUMENTS

| EP | 0231381 | 8/1987 |
| FR | 2018237 | 5/1970 |
| JP | 42-12551 | 7/1967 |
| JP | 54-85271 | 7/1979 |
| JP | 58-59817 | 4/1983 |
| JP | 60-46214 | 3/1985 |

OTHER PUBLICATIONS

Hiroshi Murayama, *Fiber(glass) Reinforced Polyamides* 176–179 (1981).

Štěpek, J., Polymers/Properties And Application 5, "Additives for Plastics".

John Wiley & Sons, "Laminated and Reinforced Plastics," Encyclopedia Of Chemical Technology Third Edition, vol. 13, pp. 973–974.

John Wiley & Sons, "Reinforced Plastics," Encyclopedia Of Polymer Science And Engineering, vol. 14, pp. 332–333.

Japanese Kokai (Laid–Opened) No. 53–138459 * English translation *.

(List continued on next page.)

*Primary Examiner*—Rich Weisberger

(57) ABSTRACT

Disclosed is a structural material excelling in lightness of weight, strength, flexural modulus and other properties, being made from polyamide resin reinforced with continuous fiber and/or long filament reinforcing material. This structural material can be fabricated by a monomer casting method by arranging said fiber reinforcing material preliminarily in a desired shape, putting it into a mold, pouring molten ω-lactams containing a polymerization catalyst and an initiator into said mold, and heating to obtain polyamide resin.

20 Claims, 17 Drawing Sheets

OTHER PUBLICATIONS

Japanese Kokai (Laid–Opened) No. 60–221346 * English translation *.

Japanese Publication (allowed) No. 59–33392 *English translation *.

Japanese Kokai (Laid–Opened) No. 55–5643 *English translation *.

"Plastics Materials—Lecture Series 9, Polyamid resins" (p.108–119) published on Apr. 15, 1961 by Nikkan Industry Press Ltd.

* cited by examiner

TABLE 3

| REINFORCED MATERIAL | NO. | SURFACE PREPARATION WITH A-70 | FLEXURAL MODULUS (kg/mm²) | BENDING STRENGTH (kg/mm²) | LUTERLAMINAR SHEAR STRENGTH (kg/mm²) | VOLUME PERCENTAGE OF REINFORCED MATERIAL (VOL %) | |
|---|---|---|---|---|---|---|---|
| CORBON FIBER CLOTH | 10-1 | YES | 5252 | 78 | 7.21 | 52 | EXAMPLE |
| | 10-2 | NO | 5115 | 75 | 6.57 | 53 | EXAMPLE |
| GLASS FIBER CLOTH | 10-3 | YES | 1767 | 46.1 | 6.17 | 40 | EXAMPLE |
| | 10-4 | NO | 1741 | 42.6 | 5.66 | 40 | EXAMPLE |
| GLASS FIBER CLOTH + EPOXY RESIN | | NO | 1800 | 48.0 | — | 44 | REFERENCE EXAMPLE |

TABLE 4

| | FIBER (REINFORCING MATERIAL) | ATTENUATION RATIO [%] |
|---|---|---|
| EXAMPLE 1 | CORBON FIBER | 0.429 |
| EXAMPLE 2 | GLASS FIBER | 0.505 |
| EXAMPLE 3 | ARAMIDE FIBER | 0.915 |
| REFERENCE EXAMPLE 1 | CARBON FIBER | 0.123 |

STRUCTURAL MATERIAL AND PROCESS FOR ITS PRODUCTION

This application is a continuation of application Ser. No. 07/403,263 filed Sep. 5, 1989, now abandoned which was a continuation-in-part application of Ser. No. 07/019,981 filed Mar. 30, 1987, abandoned.

FIELD OF INVENTION

This invention relates to a structural material suited to be used in racket frame for tennis, squash, badminton or the like, pole for tent frame, pipe for structural material, buried earth pipe, block, fishing rod or the like, and a method of fabricating the same.

BACKGROUND OF INVENTION

Fiber reinforced composite materials conventionally used as structural materials for building materials or sports articles include those prepared by adding short fiber reinforced materials to a thermoplastic resin used as the matrix, or other prepared by adding long filament reinforced materials to a thermoset resin used as the matrix.

These materials, however, involve certain problems in the forming property, strength, heat resistance and fatigue characteristic, and superior fiber reinforced composite materials have been demanded.

For example, reinforced plastic poles are recently sold on market as the pole for mountaineering tent, but they have their problems as stated below, and they are presently used partly only in a field of less rugged conditions such as picnic tent.

That is, in the composition of these reinforced plastic poles, the reinforced fibers are composed of glass, carbon, or aromatic polyamide, and the matrix is made of epoxy, polyester or other thermoset resin. The most widely employed method of fabricating reinforced plastic poles is the so-called "drawing pipe" method which is to impregnate glass fibers with polyester resin, and continuously lead into the hardening bath to be hardened. In other versions, fibers are processed by filament winding (F/W) process, not limited in the axial direction, or ABS resin or other thermoplastic resins are used as the padding or covering material, but in any event the matrix of reinforced fibers is always a thermoset resin such as polyester and epoxy.

These thermoset resins are, by nature, brittle, and are easily broken when bent sharply like a tent pole. Or if the rigidity is lowered to allow a large deflection in practical usage, problems occur in the aspects of habitability or resistance to wind pressure. In particular, when several poles are joined together, stress is concentrated at joints, and most breakdowns originate in the joint. However, in the continuous drawing method, since its section is uniform, it is difficult to reinforce only the joint part integrally. Or in the case of F/W process, it is difficult to vary the complicated joint shape or outside diameter, and there are serious problems such as fluctuations of dimensional precision and performance derived from the nonuniformity of tape wrapping.

On the other hand, in the composition of fiber reinforced plastic used as the material of golf club shaft, the reinforced fibers are composed of carbon, glass, aromatic polyamide, boron or the like, and the resin matrix is made of epoxy, polyester or other thermoset resin. All of them share a main feature of lightness of weight as compared with metallic shaft, and also provide the following merits.

1) The head speed when swinging increases.
2) Even a less powerful golfer can swing easily.

Fabrication methods of this kind of shaft are roughly divided into two types as follows.

(1) Filament winding (F/W) method

A continuous filament is impregnated with resin, and is wound on a mandrel at a specified angle in the axial direction.

(2) Sheet winding method

A cloth impregnated with resin is wound on the mandrel.

In both (1) and (2), after forming on the mandrel, the material is wrapped by heat-shrink tape, and is heated in a hardening furnace.

In these methods, however, the dimensional precision when forming the material is not sufficient, and the pressure when hardening depends on the tightening force of the wrapped tape, so that the dimensional precision of product is limited. Besides, since marks of wrapping tape are left over on the product surface, it is necessary to finish the surface by buffing with centerless grinder or the like, so that part of surface fibers is shaved off. And it is also difficult to vary the complicated shape or outside diameter noncontinuously, and the degree of freedom of design is limited. Furthermore, thermoset resins of epoxy and polyester are more brittle, and may be broken when an impact is applied.

In addition, the following two types are known as the composition of fiber reinforced plastics for racket frame for ball games.

(1) Continuous fiber/resin matrix type
(2) Short fiber of chopped fiber/resin matrix type In type (1), epoxy, polyester or phenolic thermoset resin is used as the resin matrix, and it is impregnated in continuous filament, and heated and pressurized, so that the resin is hardened and molded into a desired shape.

In type (2), the reinforced members are composed of fiber reinforced members of short discontinuous length randomly dispersed in the resin matrix, and this resin may be either thermoplastic or thermosetting. As the thermoset material, the one shown in (1) is used, and as the thermoplastic material, for example, nylon, polycarbonate, polyphenylene oxide, acetal and other so-called industrial thermoplastics are used. As the molding method, mainly injection molding is employed.

On the other hand, as the characteristics required in rackets, usually, toughness, rigidity and resilience are known. As for toughness, since the toughness of matrix resin of type (1) is inferior, expensive carbon fibers or other reinforced fibers are used usually by 60 to 70 wt. % in order to obtain a required toughness. Since this is an easy method of obtaining a required strength and desired shape, this method is employed in most existing tennis racket frames using reinforced plastics.

In the case of (2), usually, considering the moldability, in particular, fluidity at the time of injection, the molecular weight of matrix resin is kept low. The fiber content is about 30 wt. %, and the fiber length is mostly less than 1 mm (0.2 to 0.3 mm) after pelletizing and injection molding. Since the matrix resin is not high in molecular weight and the length of reinforced fibers is extremely short, improvement of mechanical strength in this composition is not expected. Therefore, if such racket strung with guts is kept in an automobile trunk, for example, and its internal temperature exceeds 80° C., it is highly possible that the frame may be deformed or broken during use.

To compensate for this defect, it is consequently necessary to increase the wall thickness of racket frame, but since the total weight increases, it is not so practical.

Recently, meanwhile, as sports are becoming popular as a pastime, consideration to sports injuries is required. For example, according to a certain polling, about one third of tennis players claimed to have "experienced pain in the elbow." This is known as tennis elbow, and the player feels pain suddenly in the elbow of the racket holding side without any specific cause. In a racket inferior in vibration absorption property, it is said that the vibration of hitting a ball is transmitted to the elbow to damage the humerus epicondylus. In the continuous filament/resin matrix type (1) which is in the mainstream of the present racket frame materials, since the commonly used epoxy resin and polyester resin are inferior in impact absorption, it is considered that the vibration characteristic be interior.

Incidentally, as technical reports about industrial materials using nylon resins (which is similar to that used in this invention), for example, "Nylon RIM Development for Automotive Body Panels" (SAE Technical Paper Series 850157, 1985), and "Nylon 6 RIM" (American Chemical Society, 1985) are known, and also an article relating to terminal amine polyether RIM (SAE Technical Paper Series 850155, 1985), an article relating to the future of RIM in America (American Chemical Society, 1985), and an article relating to RIM monomer casting ("Plastics Technology," May 1965 issue) are available, but nothing is mentioned about long filament reinforced products in these papers.

The present invention is devised in the light of the above background, and it is hence a primary object of this invention to present a structural material which is lightweight, excels in strength and flexural modulus, and is large in the degree of freedom of designing of shape and material as compared with that of conventional materials.

DISCLOSURE OF THE INVENTION

The structural material of this invention (a first aspect of the invention) is characterized by a polyamide resin reinforced by continuous fiber and/or long filament reinforcing material, used as the base material to form the structure. The method of fabricating the structural material of this invention (a second aspect of the invention) is a method of fabricating a structural material composed of polyamide resin reinforced by continuous fiber and/or long filament reinforcing material, in which the long fiber and/or long filament reinforcing material is arranged preliminarily in a desired shape and put in a mold, and a molten w-lactams containing polymerization catalyst and initiator is poured into the mold, and it is heated to obtain polyamide resin by monomer casting method, thereby forming a structural material.

The monomer used in this invention, w-lactams, may include the following examples: α-pyrrolidone, α-piperidone, e-caprolactam, w-enantolactam, w-caprilolactam, w-peralgonolactam, w-decanolactam, w-undecanolactam, w-laurolactam, their c-alkyl substitute-w-lactam, and mixture of two or more kinds of w-lactams. However, what is advantageous industrially is ε-caprolactam or w-laurolactam. And w-lactams may contain, if necessary, modifying components (soft components).

The molecules of a soft component possesses in molecule a functional group reacting with an initiator used, and it is a component of low Tg, and usually polyether or liquid polybutadiene possessing functional group is used.

A commercial material used in this invention may be, for example, UX-21 which is a nylon RIM material manufactured by Ube Industries, Ltd. It is composed of component A made of alkali catalyst and caprolactam, and component B made of prepolymer containing soft component and caprolactam.

As the anionic polymerization catalyst used in this invention, sodium hydride (NaH) is preferable, but also other sodium, potassium, lithium hydride and known w-lactam polymerization catalysts may be used. The content is preferably in a range of 0.1 to 5.0 mol % of w-lactam.

As the polymerization initiator, N-acetyl-ε-caprolactam is used, but other applicable examples are triallylisocyanurate, N-substitute ethylene imine derivative, 1,1'--carbonyl visazilidine, oxazoline derivative, 2-(N-phenylbenzimidoyl) acetoanilide, 2-N-morpholino-cyclohexene-1.3-dicarboxysanilide, known isocyanate, carbodimide and similar compounds. The content of the initiator is preferably in a range of 0.05 to 1.0 mol % of w-lactam. The methods of its addition include:

(A) A method of directly adding and mixing to w-lactam solution containing anionic polymerization catalyst;

(B) A method of mixing w-lactam solution containing anionic polymerization catalyst and another w-lactam solution containing polymerization initiator; and (C) A method of adding together with anionic polymerization catalyst preliminarily to the solid or liquid w-lactam. Any method may be employed.

The polymerization temperature is generally preferable in a range of 120 to 200° C., but it is also possible, for special purposes, to polymerize under 120° C. or over 200° C.

As the continuous fiber which is a reinforcing material depending on the applications, carbon fiber, aramide fiber, glass fiber, alumina fiber, silicon carbide fiber, steel wire, amorphous metal fiber and/or their hybrid may be used in a state of cloth, sleeve or roving. Continuous fiber and/or long filament of fully aromatic aramides with a modulus of elasticity in tension of 3,000 to 30,000 $kg/mm^2$, or more preferably, 5,000 to 15,000 $kg/mm^2$, are suitable.

The continuous fibers and/or long filaments are placed in the mold, for example when fabricating a pipe-shaped structural material, by winding a necessary amount around the core, or covering the core as sleeve. To obtain a block-shaped product, it may be preliminarily set in the mold.

In this invention, since the monomer casting method is employed, there is no limitation to the molecular weight in consideration of the molding processability, and a polyamide resin of high molecular weight is obtained, so that the strength, elasticity and thermal distortion temperature are high. So the thickness of the structural material may be reduced, and the weight may be light.

As the material of the thermoplastic resin reinforced by long filaments, a so-called stampable sheet is known, and as its nylon version, a sheet composed of nylon resin and continuous glass fiber mat may be considered as an example, but when obtaining a molded product of desired shape by using such stampable sheet, the following problems exist. That is, when a stampable sheet is used as molding material, it is necessary to handle the heated and melted material sheet outside the mold, and at this time the temperature is as high as 200 to 350° C., and the molten material sheet is very soft and extremely hard to handle. Besides, a heating equipment using far infrared rays is required, and the facility cost is high. Furthermore, the press pressure at the time of molding is very high, about 100 to 300 $kg/cm^2$, and the mold and other facilities are expensive. Still more, the reinforcing fibers form relief patterns on the molded product surface, or air bubbles mixed in the heating process of material cannot be forced out completely when molding and are left over on the surface, and the surface finished state is not favorable. Or it is difficult to form a thin or a complicated shape.

Therefore, the method of this invention by monomer casting process seems far more excellent.

In this invention, moreover, since a tough polyamide resin is used instead of brittle thermoset resin, the content of reinforcing fiber may be small, and in particular by using continuous fiber and/or long filament it is possible to reinforce further and decrease the content of reinforcing fibers, so that economy and light weight may be achieved together. In addition, the excellent vibration attenuating characteristic of the polyamide resin used in the matrix resin becomes more notable because the content of reinforcing fibers is small, so that the racket frame, shaft for ball games, and other structural materials light in weight and excellent in durability and appearance may be obtained.

The structural material by this invention is excellent in lightness of weight, strength, flexural modulus, vibration attenuation characteristic and other properties, because tough polyamide resin, instead of brittle thermoset resin, is used as the matrix resin, and it is further reinforced by continuous fiber and/or long filament reinforcing material.

This structural material is easily formed in a desired shape by the fabricating method according to the second invention, in which the fiber reinforcing material is preliminarily placed in a desired shape, and the matrix resin is added to it by monomer casting.

The conventional fiber reinforced composite materials were fabricated by a premix method in which the reinforcing material was premixed with the resin and then formed, and it was difficult to form in a complicated shape generally, while, in this invention, it is easy to form and the degree of freedom of design is great.

DESCRIPTION OF PREFERRED EMBODIMENTS

Embodiment 1

Figure 1:
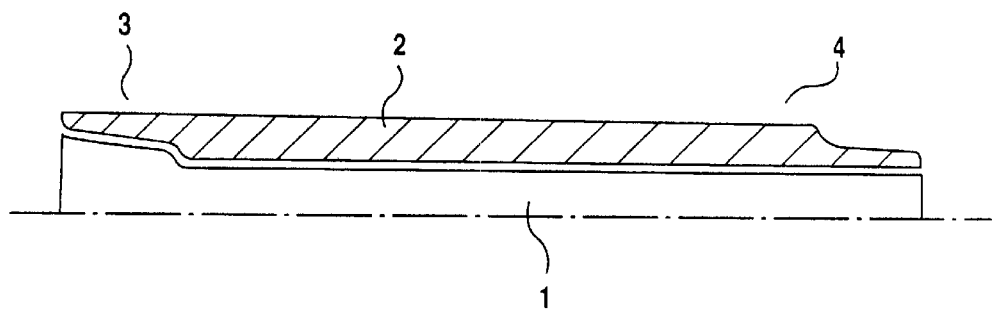
FIG. 1 to FIG. 5 are sectional views expressing the embodiments of this invention.
Figure 2:
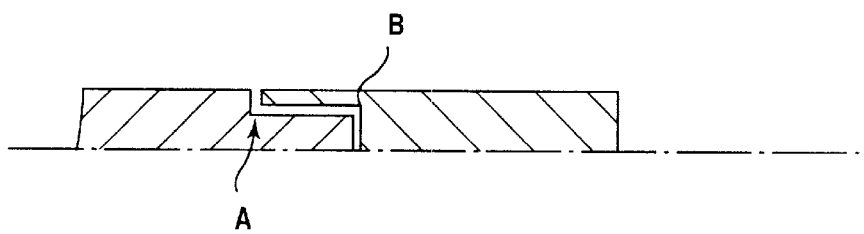

As shown in FIG. 1, carbon fibers 2 braided at an angle of 25° in the axial direction around a mandrel 1 made of stainless steel were placed in a mold by 35 wt. %. At this time, a joint 3 was curved at a position where stress was concentrated due to bending deformation to obtain a face contact, and the convex and concave portions were tapered to increase the wall thickness at parts A and B shown in FIG. 2 where breakage often occurred at the joint of the conventional rectangular section. This mold was heated at 150° C., and was evacuated to 1 mmHg by using a vacuum pump. 100 g of ε-caprolactam was heated and melted at 130° C. in a 1-lite flask while replacing with nitrogen, and 0.21 g of NaH (50% oil-based) was added to reacted and dissolve completely. At the same time, in another 1-liter flask, 100 g of ε-caprolactam was put, and was heated and melted at 130° C. while similarly replacing with nitrogen, and 0.13 g of N-acetyl-ε-caprolactam was added to dissolve completely. In said mold, these lactam mixture solutions were poured simultaneously, and the mold was kept at 150° C. for 30 minutes. After being taken from the mold, the lactam mixture annealed in a 90° C. oil for 2 hours, and heated in boiling water for 3 hours.

As result, a pipe for structural material 4 excelling in lightness of weight, flexural modulus and bending strength was obtained.

Embodiment 2

Figure 3:
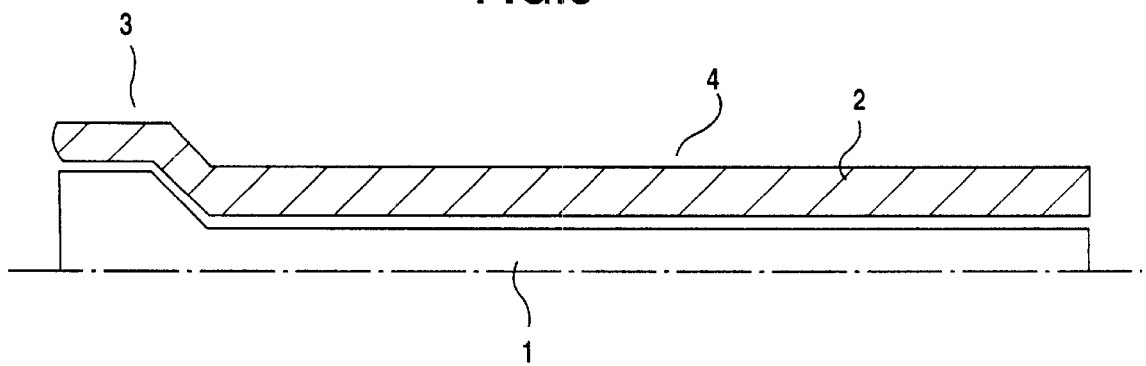

The procedure was same as in embodiment 1, except that the outside diameter of the concave portion of joint 3 was increased as shown in FIG. 3 in order to increase the strength at the joint part.

As a result, a pipe for structural material 4 excelling in lightness of weight, flexural modulus and bending strength, same as in embodiment 1, and further reinforced in the joint was obtained.

Embodiment 3

Figure 4:
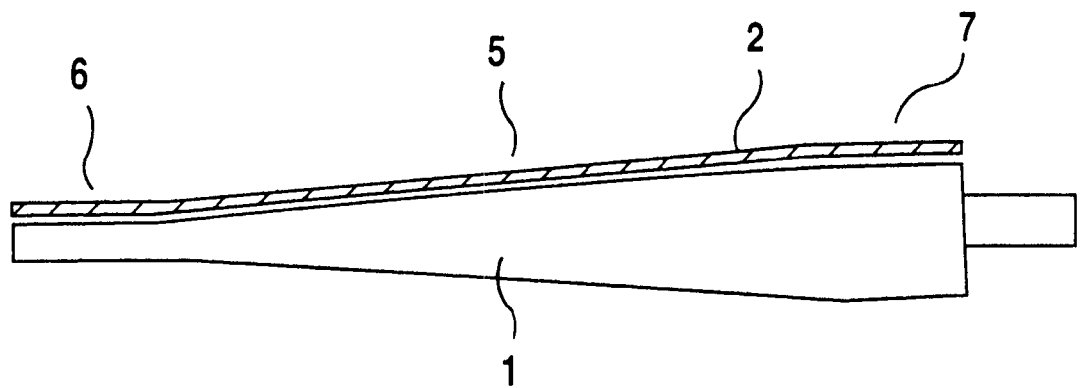

As shown in FIG. 4, carbon fibers 2 were braided at an angle of 25° in the axial direction around a mandrel 1 made of stainless steel were placed in a mold by 35 wt. %. This mold was heated to 150° C., and evacuated to 1 mmHg by vacuum pump. In a 1-liter flask, 100 g of ε-caprolactam was heated and melted at 130° C. while replacing with nitrogen, and 0.21 g of NaH (50% oil-based) was added to react and dissolve completely. At the same time, in another 1-liter flask, 100 g of ε-caprolactam was taken, and heated and melted at 130° C. while similarly replacing with nitrogen, and 0.13 g of N-acetyl-ε-caprolactam was added to dissolve completely. These lactam mixture solutions were simultaneously poured into said mold, and a lid was put on immediately, and the mold was kept at 150° C. for 30 minutes.

As a result, a golf club shaft 5 of hollow pipe shape was obtained.

Finally, a persimmon head was attached to the end 6 in FIG. 4 and a rubber grip to the grip part 7, and a product was completed. When actually golf balls were hit, the durability was sufficient.

Figure 5:
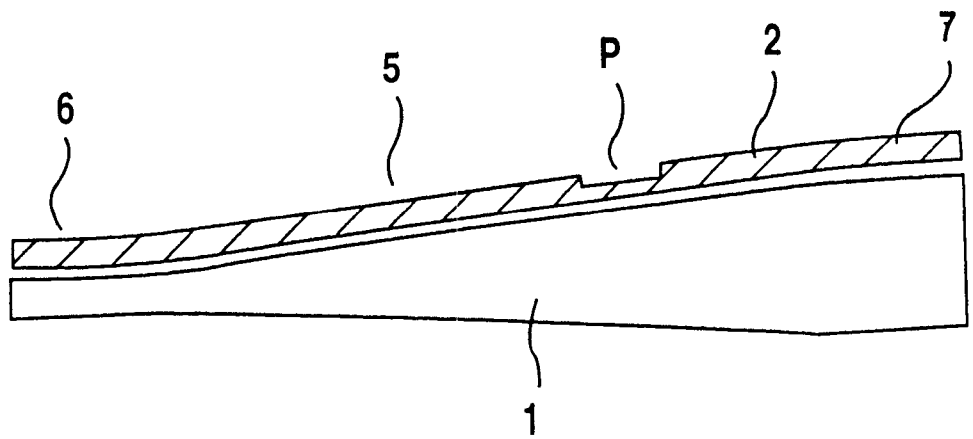
Figure 6:
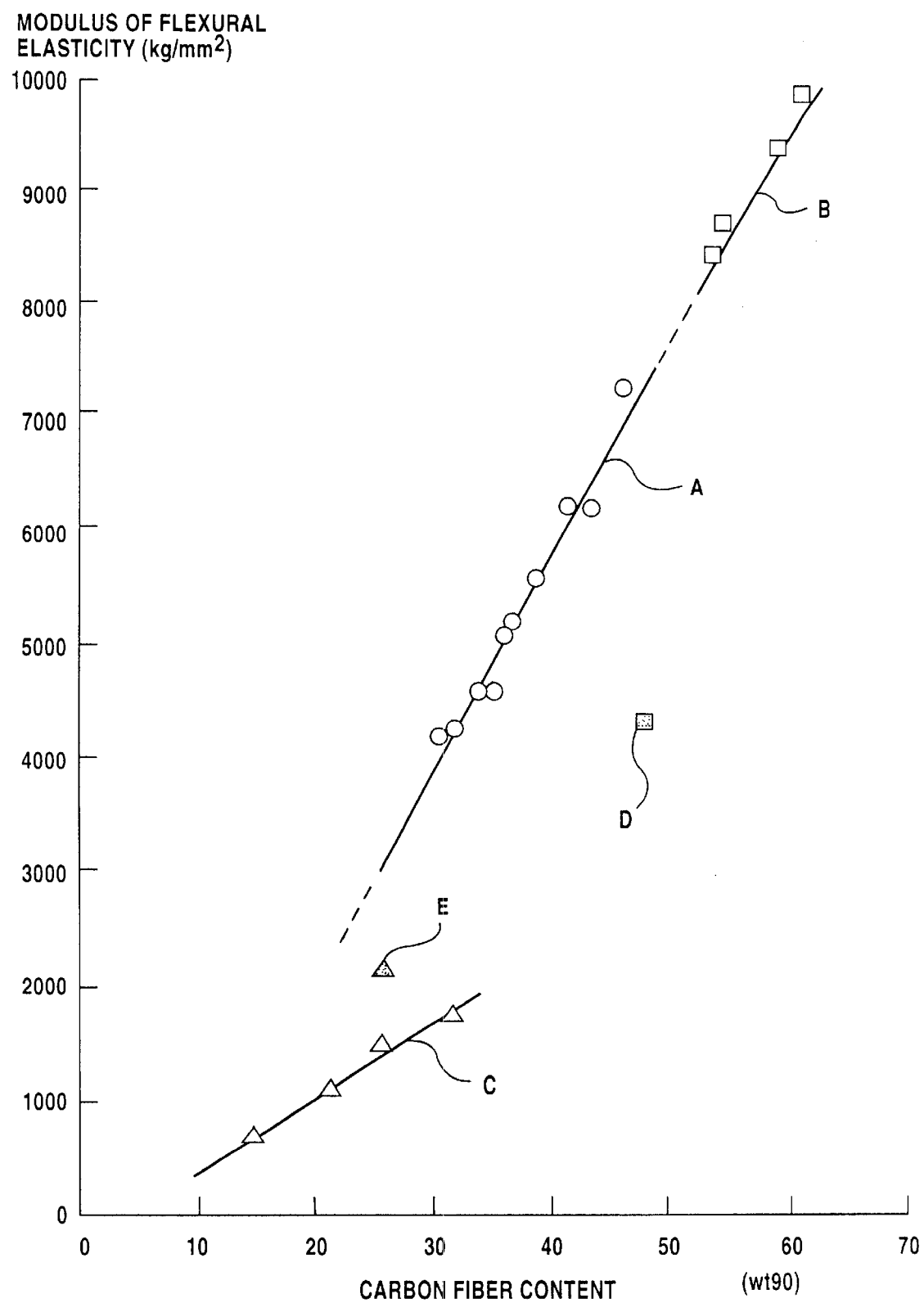
FIG. 6 and FIG. 7 are graphs expressing the elasticity and bending strength.
Figure 7:
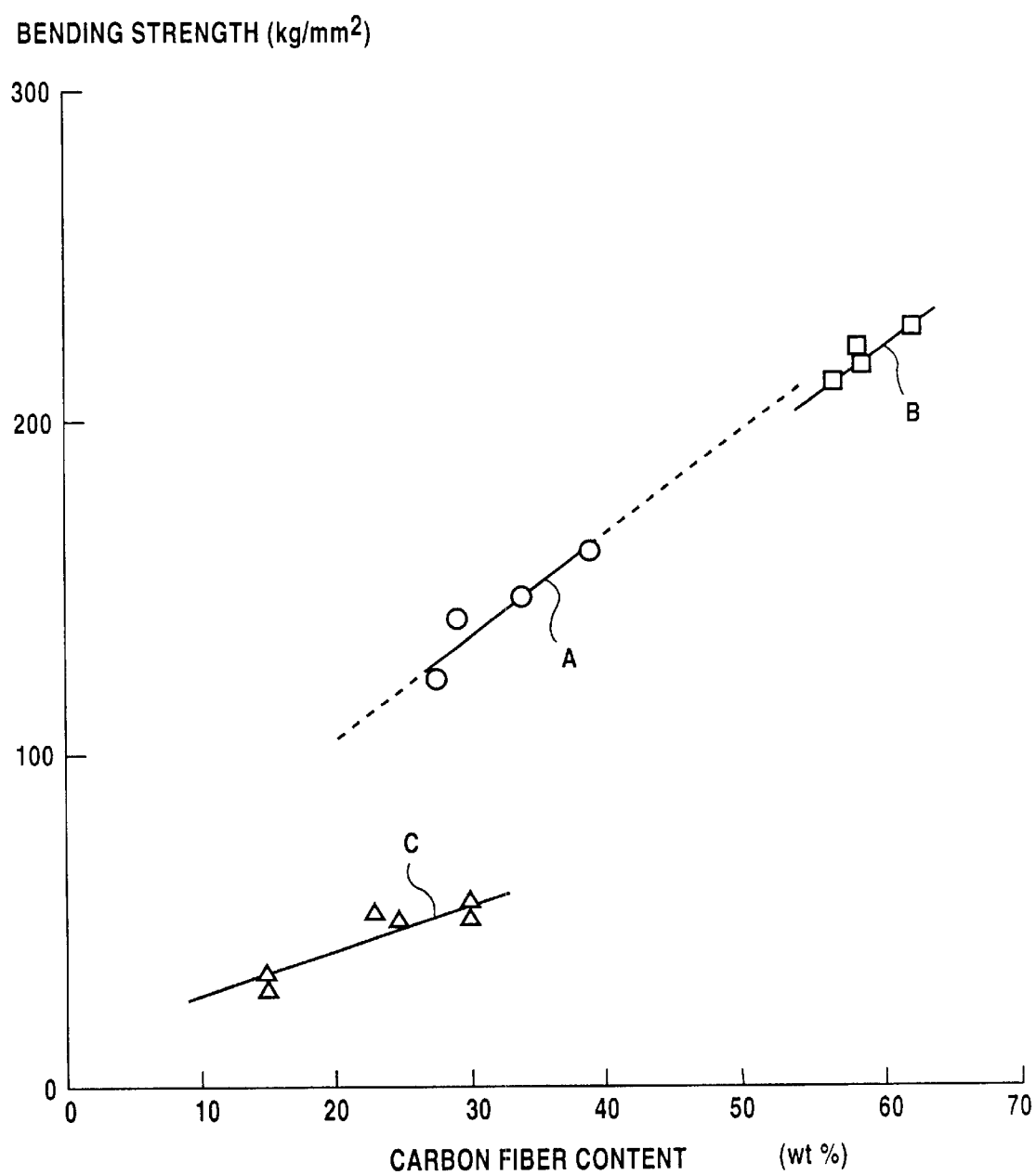
Figure 8:
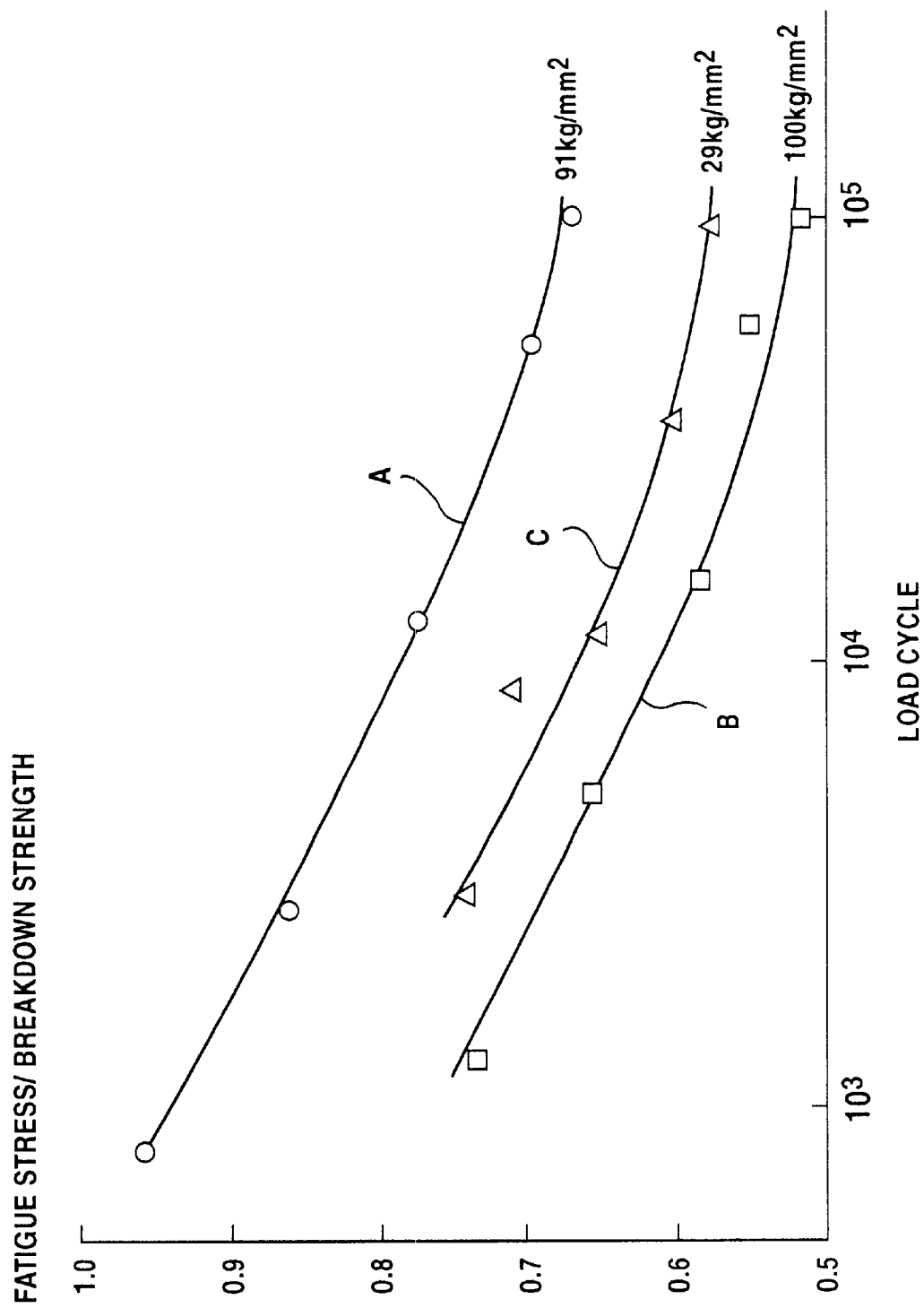
FIG. 8 and FIG. 9 are graphs to express the fatigue curve.

As shown in FIG. 5, the procedure was same as in embodiment 3, except that carbon fibers 2 were arranged so that the wall thickness was smaller in part (part P) of a shaft 5 than in other parts.

By Shifting the position of part P to the end 6 or grip 7 side, the position of kick point could be freely designed.

Embodiment 5

The structural material of this invention was fabricated by varying the content of carbon fibers according to the same monomer casting method as in embodiment 1, except that the fiber angle was 150°.

In thus obtained structural materials, the flexural modulus, bending strength, fatigue characteristics, heat resistance, and breakdown energy were investigated, and the results were as shown in FIGS. 6, 7, 8, 9 and TABLES 1, 2. In these diagrams, A refers to the product of this invention, B denotes test pieces composed of epoxy matrix reinforced with long fiber (carbon fiber) an epoxy prepreg material, C is a polyamide resin material using short fiber (carbon fiber) reinforcing material, D represents test piece cut out from a commercial tennis racket frame which is made of an epoxy prepreg material, and E is a tennis racket frame of polyamide resin/short fiber (carbon) type. All of B through E are reference examples.

Figure 9:
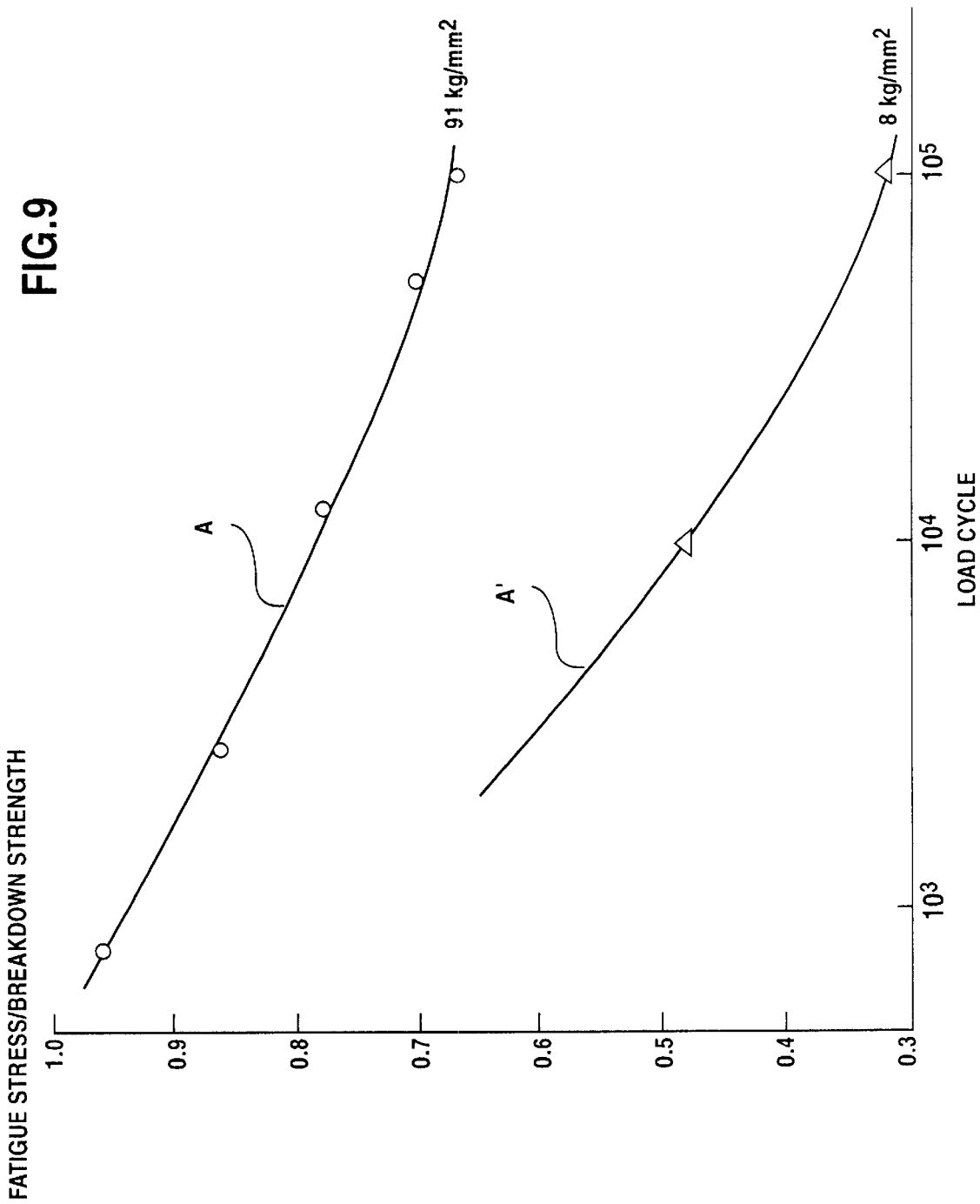

In FIG. 9, the rate of fatigue stress due to breakdown strength is plotted on the axis of ordinates, and the load cycle is given on the axis of abscissas, in which A refers to the structural material (carbon fiber) of this invention formed by monomer casting method, a A' is a composite material (stampable sheet) made from nylon resin using continuous glass fiber mat as reinforcing material.

The test condition were as follows. A fiber angle was ±15°. The test carried out by three-point bending at test speed of 2.5 mm/min for flexural modulus and bending strength. The test span was 100 mm, and the test piece measured 4 mm thick×10 mm wide×150 mm long. The method of fatigue test was three-point bending at a constant stress and test frequency of 1 Hz. The fiber angle was ±15°, the test piece dimensions were 4 mm thick×10 mm wide× 150 mm long, and the test span was 80 mm, the fixed durability limit was $10^5$ times.

The breakdown energy was in the same condition as in bending strength. For heat resistance, the holding rate of stiffness (E100/E20, E150/E20) at 100° C. (E100) and 150° C. (E150) was determined from the stiffness at room temperature (E20). In these tests, type 2050 apparatus by Intesco was used.

To measure the attenuation performance, a test piece measuring 4 mm thick×10 mm wide×150 mm long at fiber angle of ±15° was suspended by a string, and was given an impact by an impact hammer, and the acceleration (α) was measured by acceleration pickup to determine α/F by frequency analysis.

Figure 10:
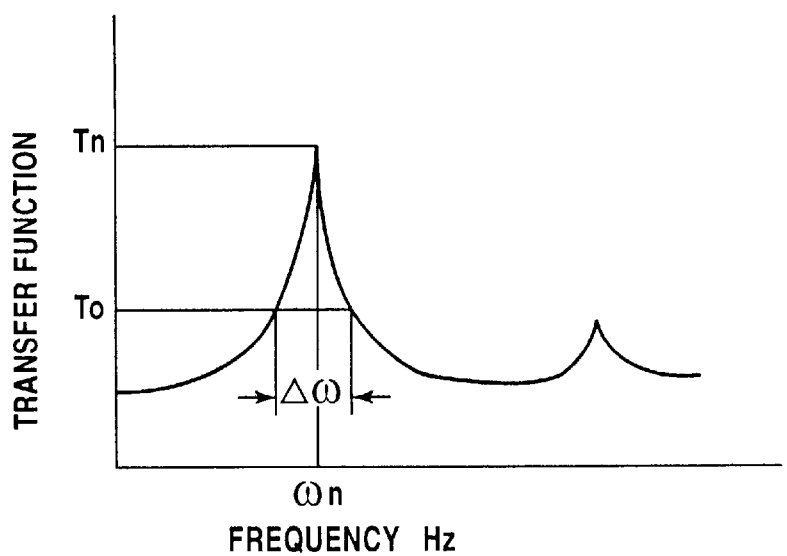
FIG. 10 is an explanatory diagram of calculating method of damping ration

The damping ratio (ζ) was calculated by using dynamic analyzer 356A manufactured by YHP. That is, by frequency analysis of α/F, ζ was determined in the following equation from FIG. 10.

$$\zeta = (\tfrac{1}{2}) \times (\Delta\omega/\omega n),\ T_o = T_n/\sqrt{2}$$

The result was 0.0558 in nylon resin (UX-21 being heated and polymerized) without reinforcing fiber, 0.0107 in nylon resin with carbon fibers without surface treatment (fiber angle 17°), 0.0135 in nylon resin with carbon fibers surface treated by nylon surface treating agent (fiber angle 12°), 0.0122 in nylon resin with carbon fibers without surface treatment (fiber angle 19°), 0.0230 in nylon resin (NY66) with 15 wt % carbon fibers, 0.0159 in NY66 with 30 wt % carbon fibers, 0.0098 an epoxy resin with carbon fibers, and 0.0323 in a test piece cut out from a commercial racket frame (Max. 200G PRO).

As clear from these findings, the structural material by this invention was excellent in strength, heat resistance, fatigue characteristic, etc.

Embodiment 6

Figure 11:
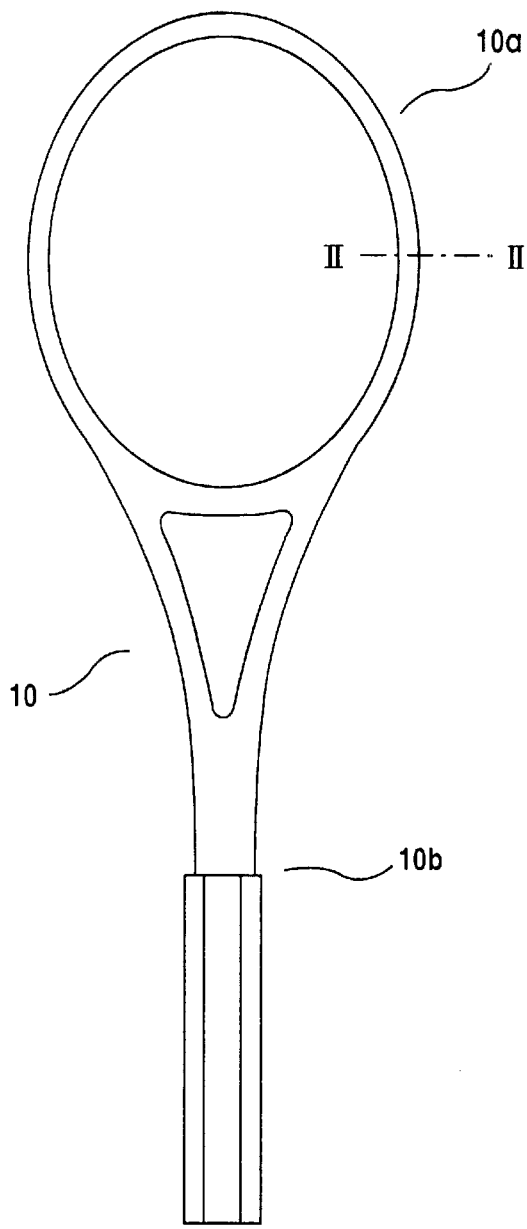
FIG. 11 is a front view of a tennis racket frame.

Braided carbon fibers were wound around nylon tube which was a synthetic resin tube, by 45 wt. %, and a resin cloth aromatic polyamide resin (tradename KEVLAR49) by 10 wt. %, and they were put in a mold of mid-size tennis racket frame. This mold was heated to 150° C., and evacuated to 1 mmHg by using a vacuum pump. Precisely 300 g of ε-caprolactam was heated and melted at 130° C. in a 1-liter flask while replacing with nitrogen, and 0.64 g of NaH 50% oil based) was added to react and dissolve completely. At the same time, in another 1-liter flask, 300 g of ε-caprolactam was put, and was heated and melted at 130° C. while similarly replacing with nitrogen, and 0.4 g of N-acetyl-ε-caprolactam was added to dissolve completely. These lactam mixture solutions were simultaneously put into said mold, and a lid was immediately put on, and the mold was kept at 150° C. for 30 minutes. Its core part 16 was filled with urethane foam, and grip was attached to a shaft part 10b to manufacture a product as shown in FIG. 11. This tennis racket frame 10 had head part 10a and grip part 10b, and the product weight was 325 g. This frame 10 was strung with gut and was used in actual play, and there was no problem in its durability.

Figure 13:
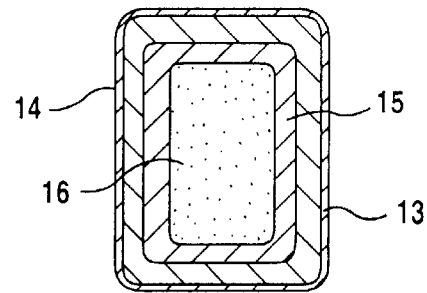
FIG. 13 is a sectional view of a product by this invention.
Figure 15:
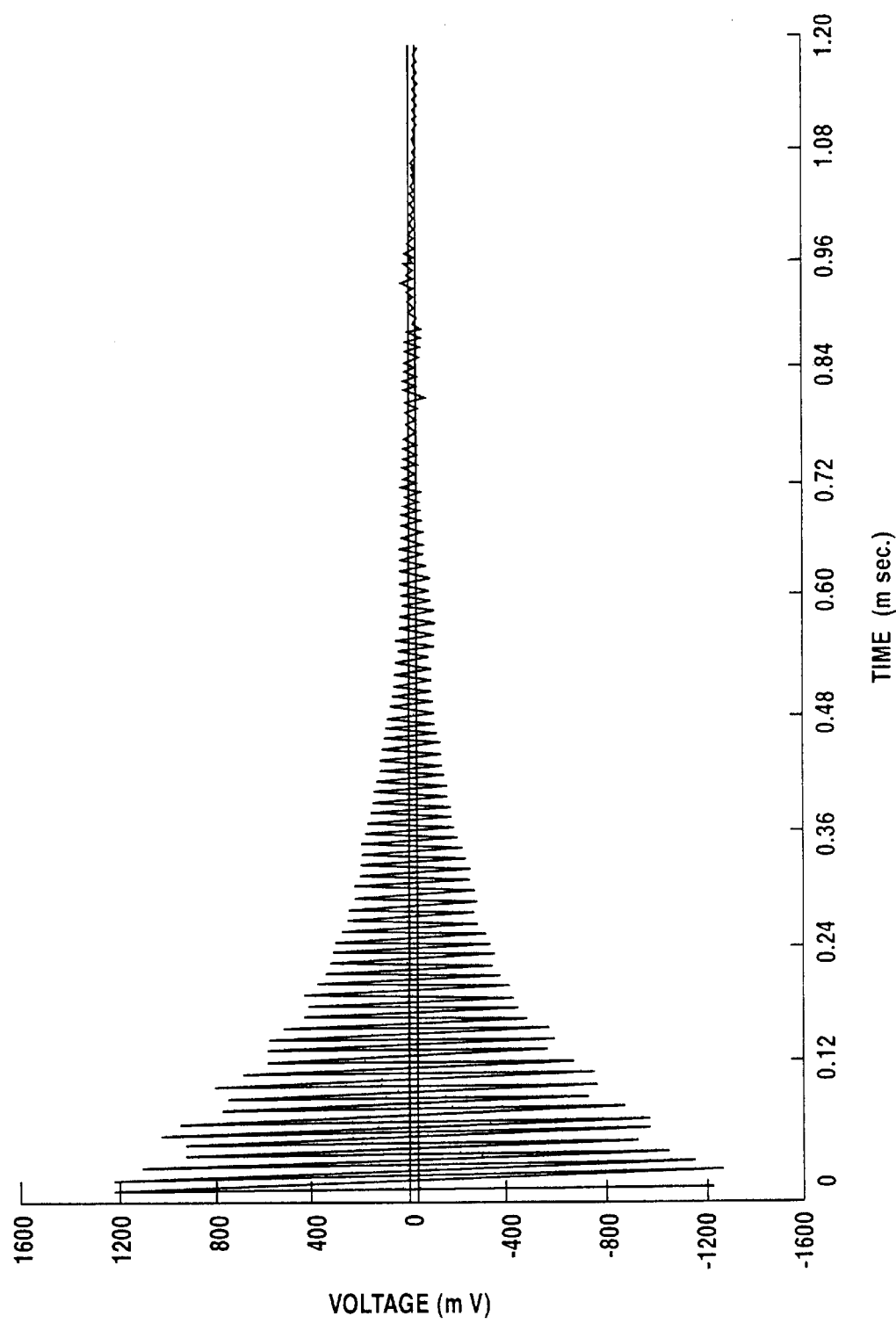
FIG. 15 and FIG. 16 are graphs to express the attenuation waveform of an embodiment and a reference example.

The vibration attenuation characteristic of this racket strung with gut is shown in FIG. 15. FIG. 15 is realized by this invention, possessing a section as shown in FIG. 13, in which the filled core 16 is foamed urethane as mentioned above, numeral 15 is a nylon tube, 14 is a surface resin layer (nylon) and 13 is a substrate made of a sleeve of continuous filament of 45 wt. % carbon fibers and 10 wt. % aromatic polyamide resin fibers (tradename KEVLAR49A).

Figure 12:
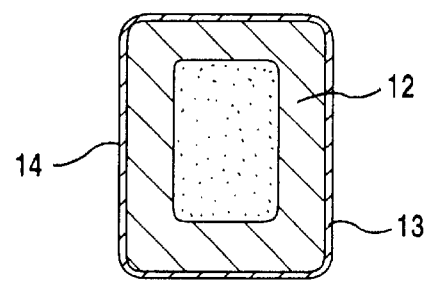
FIG. 12 is a sectional view of a conventional product.

FIG. 12 and FIG. 15 are reference examples showing the vibration attenuation waveform of a racket, using foamed urethane as core 12 and having an outside part 13 made of epoxy resin contain 70 wt. % of continuous filaments of carbon fibers being hardened by heating and pressurizing. Numeral 14 is a resin layer (epoxy resin). The racket weighed 340 g.

Figure 14:
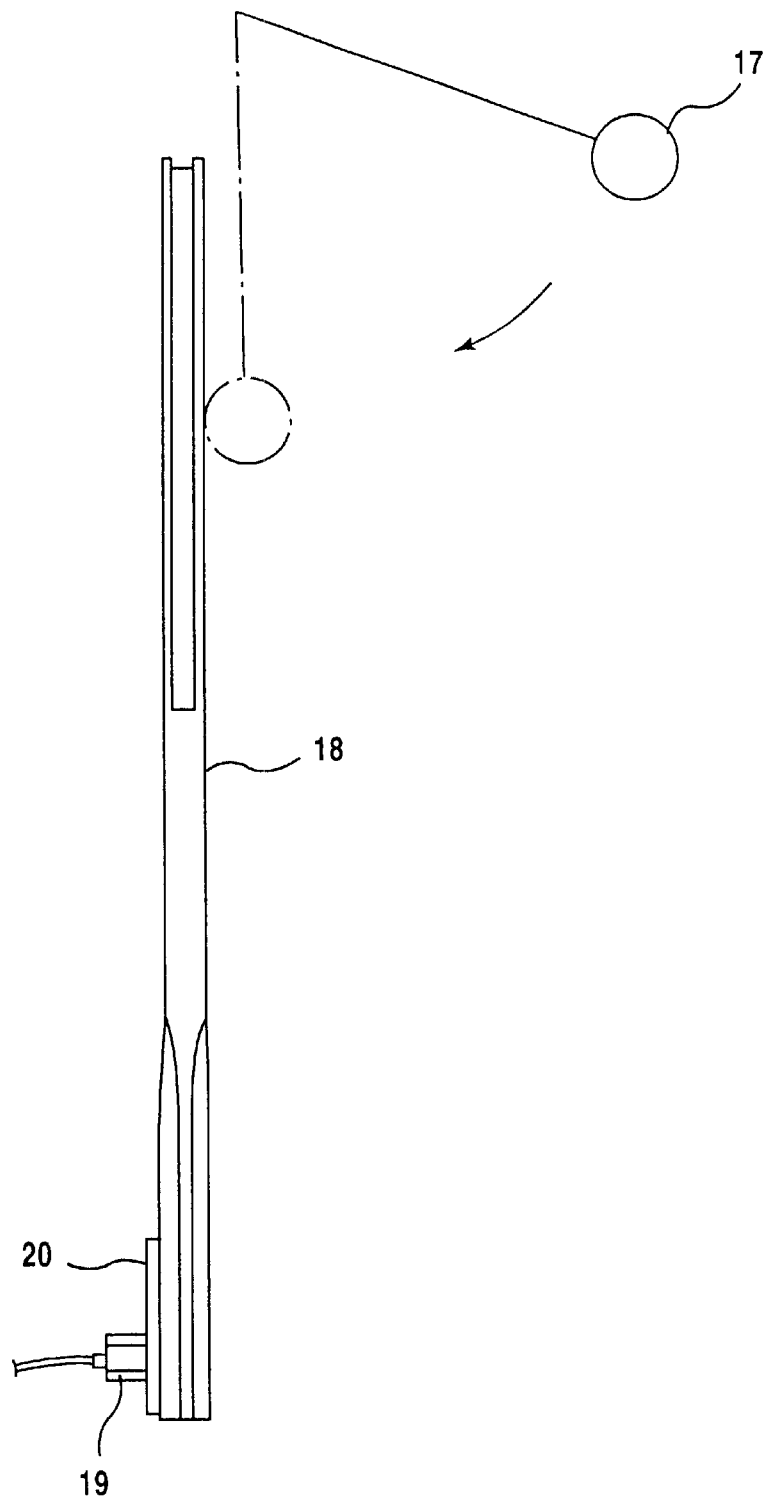
FIG. 14 is an explanatory diagram of testing method of attenuation characteristic.

The vibration attenuation waveform was obtained as follows. As shown in FIG. 14, a tennis ball 17 was suspended on a string, and it was dropped by gravity to hit against the center of hitting area of a racket 18 strung with gut which was also suspended on a string with the frame hitting part (head part 10a) upward, and the attenuation of the vibration at this time was received by an accelerometer 19 which was mounted on the grip by way of an aluminum plate 20. And it as observed on a cathode-ray tube as vibration attenuation waveform.

Figure 17:
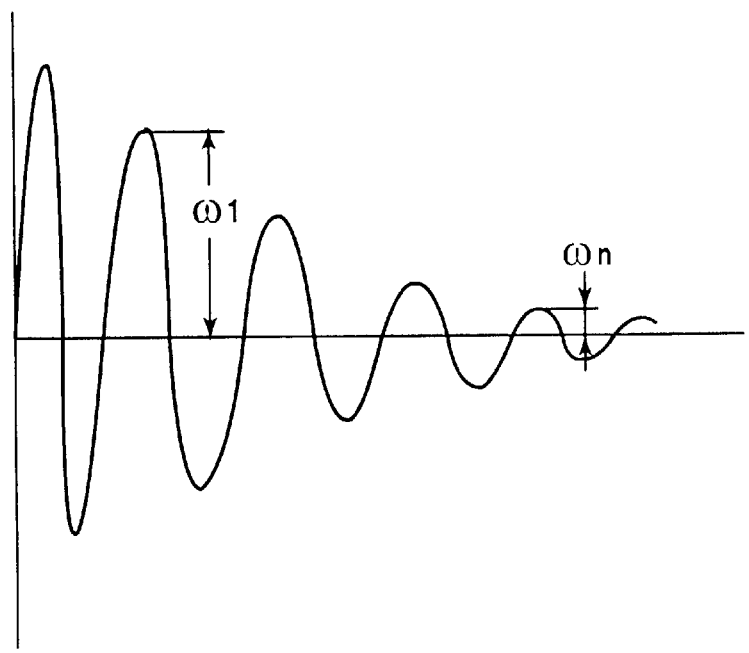
FIG. 17 is an explanatory diagram of calculating method of damping ratio.

From the attenuation waveforms in FIG. 15 and FIG. 16 thus obtained, the damping ratio ζ was determined in the following equation according to FIG. 17.

$$\zeta = \frac{1}{\pi(m-1)} \cdot \ln \frac{w1}{w2}$$

Figure 16:
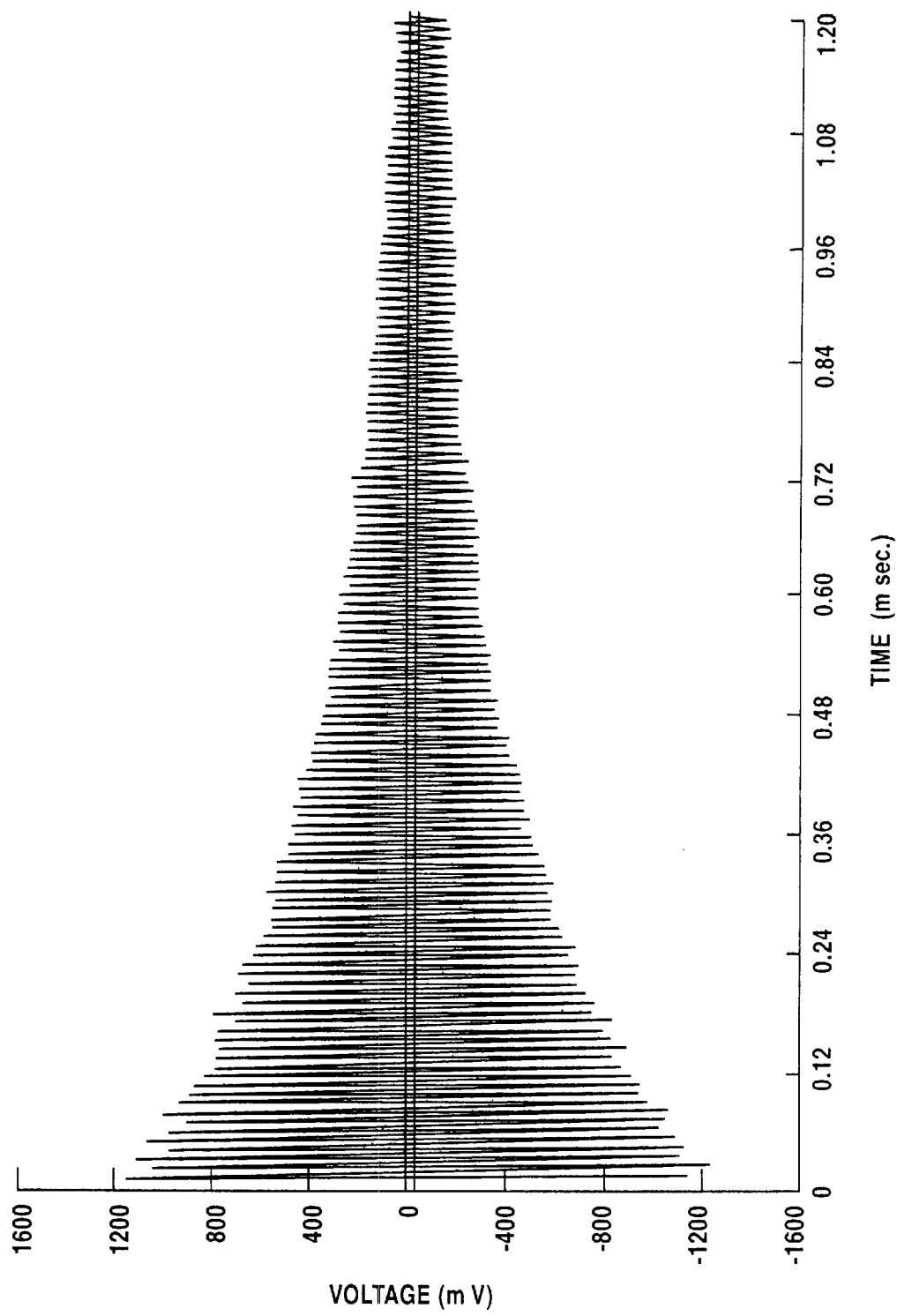

When the damping ratio was calculated, it was 0.0222 in FIG. 16, and 0.0582 in FIG. 15. As clear from this fact, the product of this invention was extremely excellent in the vibration characteristic as compared with conventional products.

Embodiment 7

Component A of UBE Nylon RIM (UX-21) (caprolactam containing alkali catalyst) and component B (caprolactam containing prepolymer) were heated and melted at 90 to 100° C. while replacing with nitrogen, and components A and B were quickly mixed, poured into carbon fibers (reinforcing material) surface treated with 0.5% methanol solution of Toray AQ Nylon (A-70) and kept at 150° C. for 10 minutes.

Using this material, a similar racket frame to the one in embodiment 6 was prepared. The obtained racket frame presented equal or better performances as compared with the product of embodiment 6.

Embodiment 8

The procedure was same as in embodiment 7, except that a cloth was used so as to contain carbon fibers by 30 wt. % as reinforcing fibers. The head wall thickness of frame was 1.5 mm (average). The intrinsic viscosity (n) of the resin of this racket frame was 3.07 (solvent m-cresol; according to ISO 307).

Embodiment 9

The procedure was same as in embodiment 8, except that the content of carbon fibers was 70 wt. %, and that the hitting area of frame was 170% larger than that of mid-size, and that the head wall thickness of frame was 1 mm at maximum.

Embodiment 10

Using carbon fibers and glass fibers in plain woven state as reinforcing materials, these surfaces were preliminarily immersed in 0.5 wt. % methanol solution of Toray AQ Nylon (A-70), and the structural material of the invention was manufactured by monomer casting method. This material was a plate measuring 300 mm by 150 mm by 4 mm in thickness. The results of measurement of modulus in flexure, bending strength and interlaminar shear strength of the obtained structural material are shown in Table 3.

The matrix in this embodiment was nylon RIM (Ube industries, UX-21), and the properties of the matrix alone without containing the reinforcing material were the tensile strength of 7.4 kg/mm$^2$, modulus in flexure of 333 kg/mm$^2$, bending strength of 12.6 kg/mm$^2$, and elongation at breakage of 21%. These test methods conformed to JIS K 6911. The temperature of thermal deformation according to JIS K 7207 was 195 to 200° C. A preferred modulus in flexure of nylon RIM as matrix is 10 to 1,000 kg/mm$^2$, or 30 to 400 kg/mm$^2$ more preferably.

The carbon fiber cloth used as reinforcing material was W-3101 of Toho Rayon Co., Ltd. and the glass cloth was WE35D 104BZ of Nitto Boseki Co., Ltd.

Embodiment 11

Using carbon fiber, glass fiber and aramide fiber as reinforcing material, structural materials were manufactured by the monomer casting method same as in Example 10, and the vibration absorbing performance was tested. The carbon fiber was W-3101 of Toyo Rayon, the glass fiber WE35D 104BZ of Nitto Boseki, and the aramide fiber was Technora of Teijin Limited (elastic modulus in tension of 7,100 kg/mm$^2$).

Figure 18:
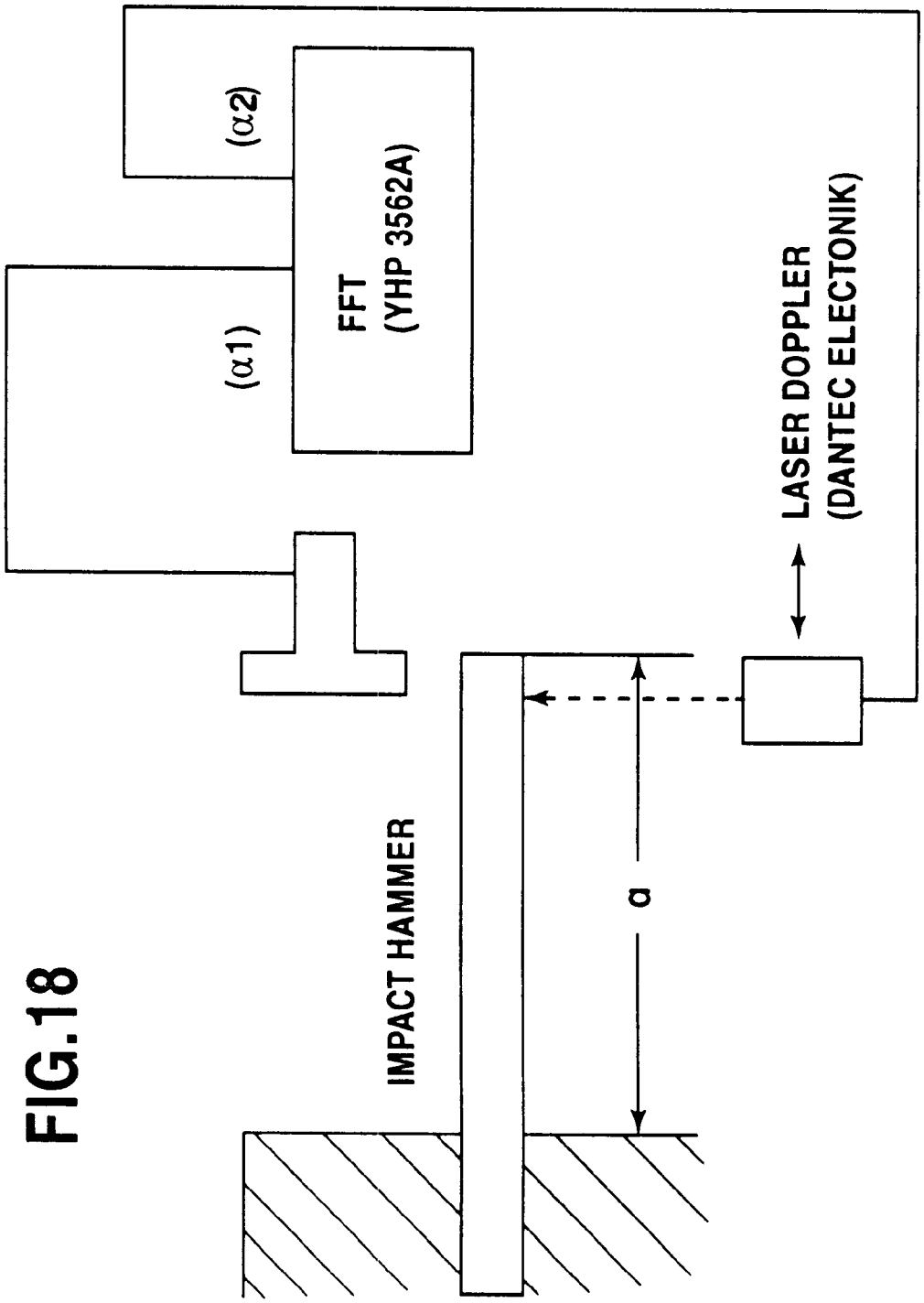
FIG. 18 is an explanatory diagram of a testing method of attenuation ratios.
Figure 19:
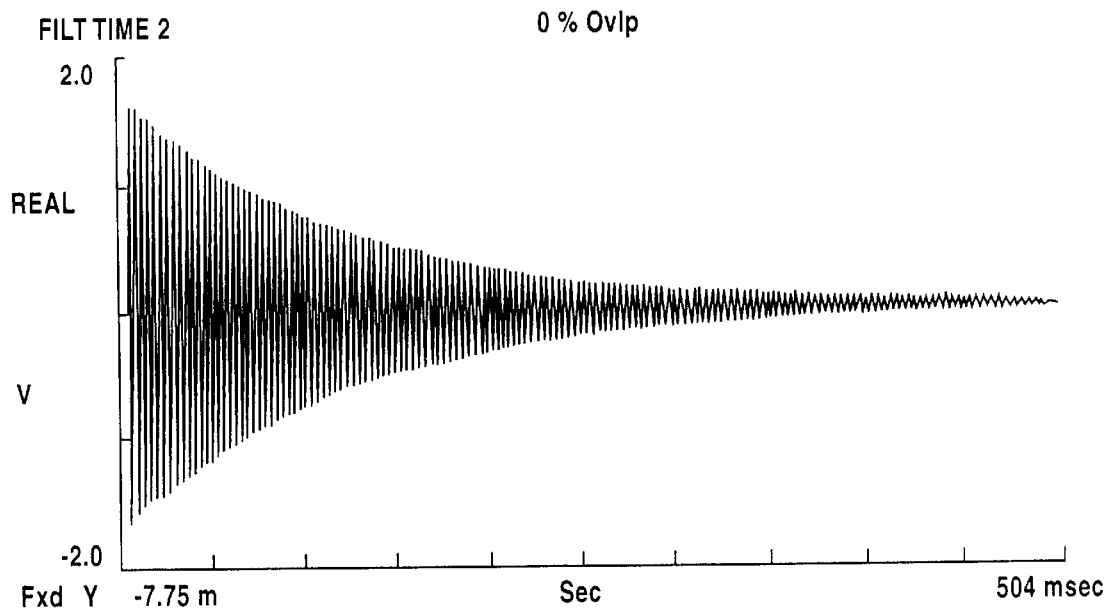
FIG. 19 to FIG. 22 are graphs to express the vibration absorbing performance of examples.
Figure 20:
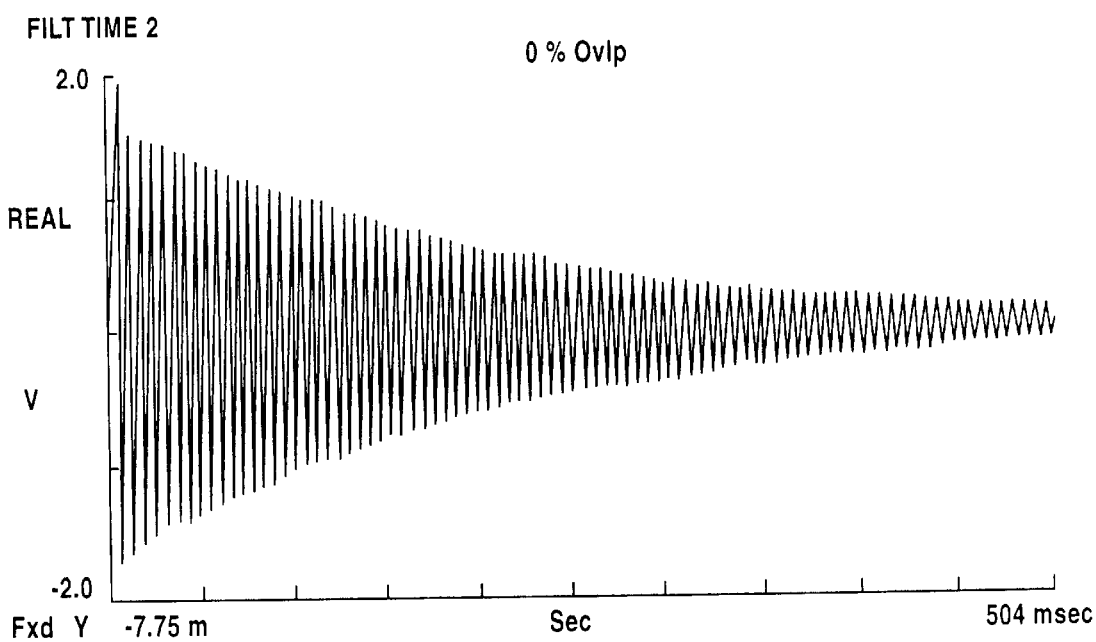
Figure 21:
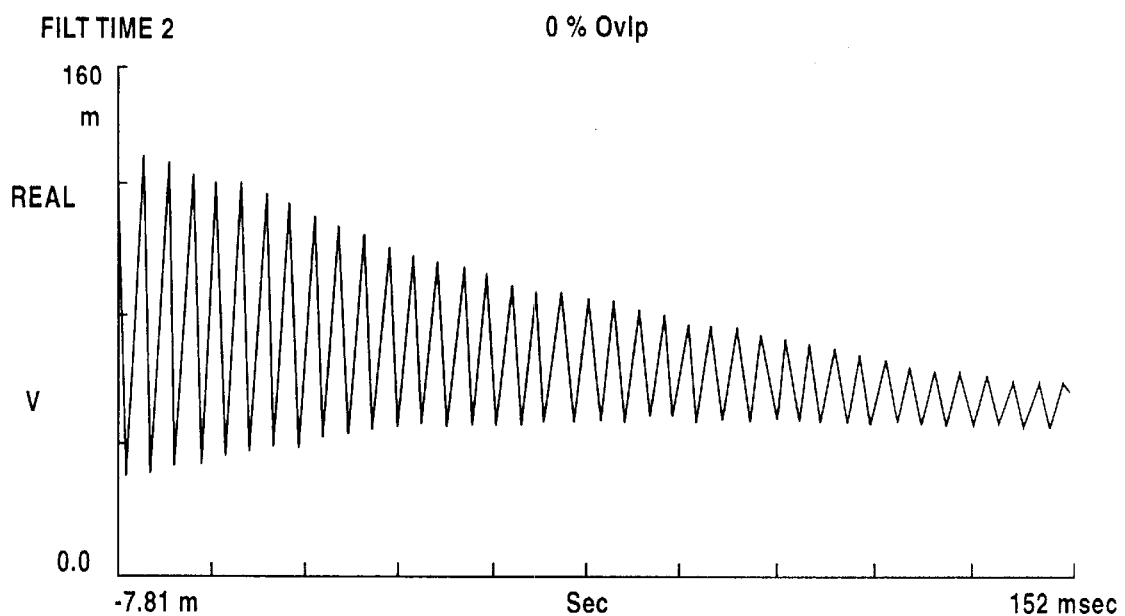
Figure 22:
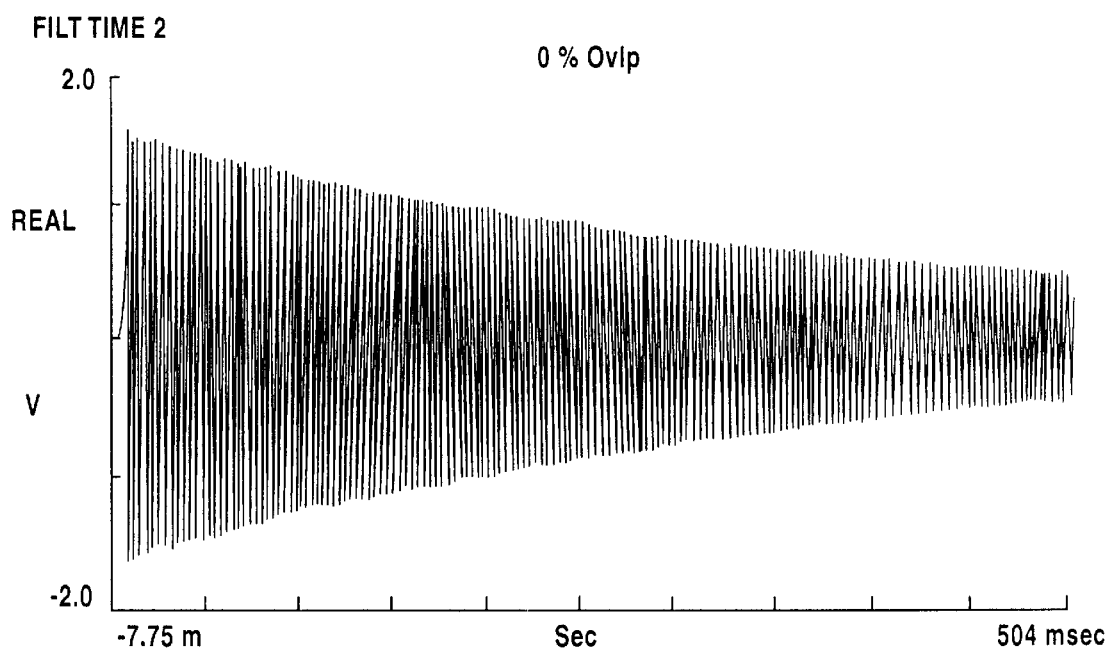

In the test method, as shown in FIG. 18, one and of the test piece was completely fixed, and an impact was applied to the other end by means of an impact hammer. This impact force is entered as signal α 1 to the dynamic structural analyzer (FFT) by means of the force sensor attached to the end of the impact force of the impact hammer. The test piece is oscillated and vibrated by the impact force of the impact hammer. The speed of this vibration is detected by the laser Doppler type sensor provided at the free end of the test piece, and is fed to the FFT as signal α 2. From the obtained dated, same as in Example 5, the attenuation ration (ζ) is calculated according to the specified formula, and the result is shown in Table 4, and also plotted in FIG. 9, in which the axis of the abscissas denotes the time and the axis of ordinates indicates the vibration amplitude.

Meanwhile, the performance of reference example is shown by using long filament of carbon fiber as the reinforcing material, and epoxy resin as the matrix.

Embodiment 12

A pipe-shaped structure measuring 18 mm in outside diameter×15.5 mm in inside diameter×357 mm in length was fabricated by using carbon fiber brainding as the reinforcing material same as in Example 1. The matrix was same as in Example 10. The carbon fiber of the reinforcing material being used as BG-7364-45 of Toyo Rayon, and the glass fiber of BG-7364-45. The obtained structure was subjected to the same vibration test as in Example 11, and vibration absorption performance was measured. The results are shown in Table 5.

Embodiment 13

Same as in Example 10, a structural material was manufactured by the monomer casting method. The obtained structural material was subjected to fatigue test by three-point bending. The test piece measured 100 mm in length, 15 mm in width and 4 mm in thickness. The span interval was 64 mm, the stress was constant, and frequency was 10 HZ.

Figure 23:
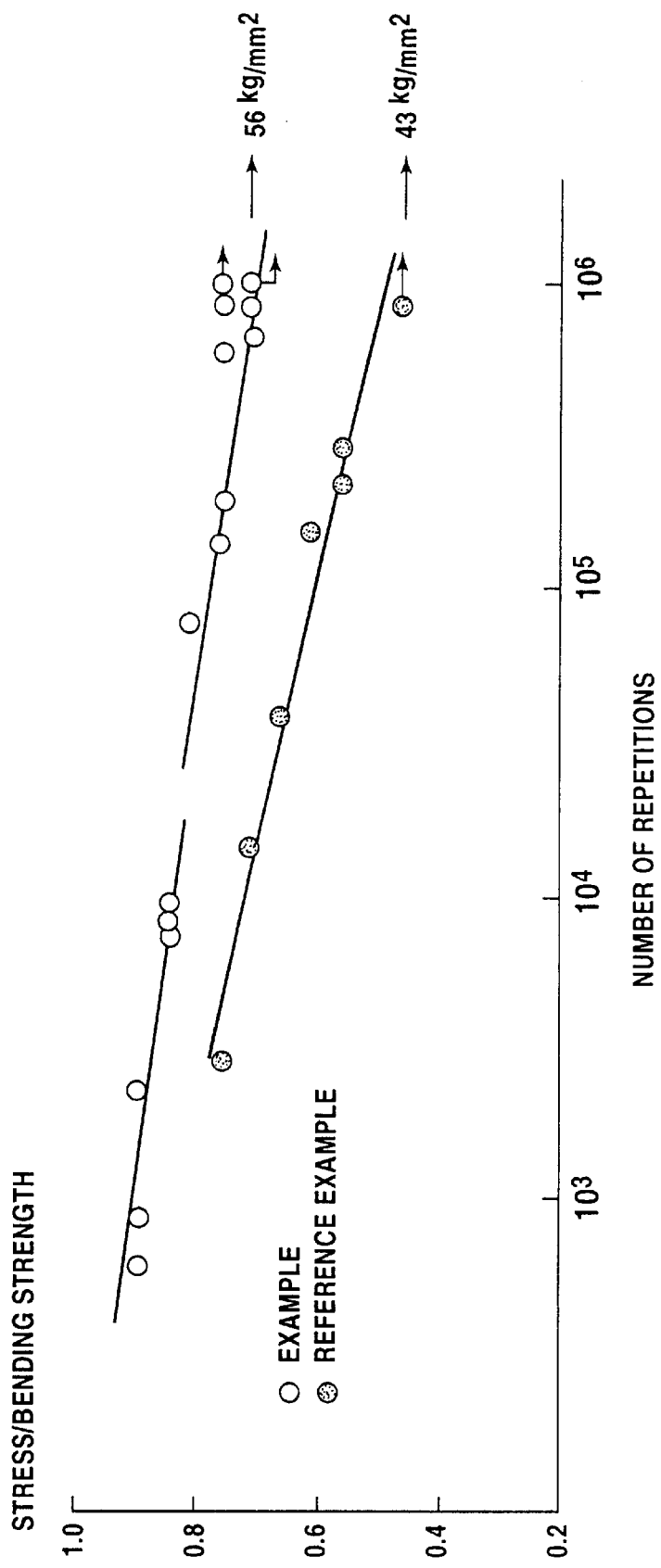
FIG. 23 is a graph to express the results of the fatigue test; Table 3 shows the mechanical properties of the examples; and Table 4 shows the attenuation ratio of the examples.

The obtained results are shown in FIG. 23. In the diagram, the axis of ordinates refers to the value obtained by dividing the stress applied in the fatigue test by the bending strength, and the axis of abscissas denotes the number of repetitions. In the reference example, the epoxy resin using plain woven carbon fiber as the reinforcing material was used as the matrix.

TABLE 1

Heat Resistance

| | | Short fiber reinforced Nylon 6-6 resin | | | Long filament reinforced epoxy resin | | |
|---|---|---|---|---|---|---|---|
| | Embodiment | Sheet sample reference example | Racket frame reference example | | Sheet sample reference example (A) | (B) | Racket frame reference example |
| Fiber content [wt. %] | 35 | 15 | 30 | 26 | 60 | 60 | 48 |
| Holding rate of flexural modulus at 100° C. [%] | 82 | 35 | 40 | 54 | 97 | 18 | 43 |
| Holding rate of flexural modulus at 150° C. [%] | 78 | 30 | 35 | 47 | 58 | 10 | 48 |

TABLE 2

Breakdown Energy

| | Embodiment | Long filament reinforced epoxy resin reference example |
|---|---|---|
| Fiber content [wt. %] | 35 | 60 |
| Breakdown energy | 650 | 700 |

TABLE 3

| Reinforced Material | No. | Surface Preparation with A-70 | Flexural Modulus (kg/mm²) | Bending Strength (kg/mm²) | Interlaminar Shear Strength kg/mm² | Volume Percentage of Reinforced Material (vol %) |
|---|---|---|---|---|---|---|
| Example | | | | | | |
| Corbon Fiber Cloth | 10-1 | Yes | 5252 | 78 | 7.21 | 52 |
| | 10-2 | No | 5115 | 75 | 6.57 | 53 |
| Glass Fiber Cloth | 10-3 | Yes | 1767 | 46.1 | 6.17 | 40 |
| | 10-4 | No | 1741 | 42.6 | 5.66 | 40 |
| Reference Example | | | | | | |
| Glass Fiber Cloth + Eposy Resin | | No | 1800 | 48.0 | — | 44 |

TABLE 4

| | Fiber (Reinforcing Material) | Attenuation Ratio [%] |
|---|---|---|
| Example 1 | Corbon Fiber | 0.429 |
| Example 2 | Glass Fiber | 0.505 |
| Example 3 | Aramide Fiber | 0.915 |
| Reference Example 1 | Carbon Fiber | 0.123 |

What is claimed is:

1. A molded article consisting of a polyamide resin reinforced by a reinforcing material which is one selected from the group consisting of continuous fiber and filament having a length of at least 1 mm, said molded article being obtained by a monomer casting method comprising the steps of:

(1) treating said reinforcing material with an agent for improving the adhesion between said reinforcing material and said polyamide resin, wherein said agent is soluble in alcohol or water or in both alcohol and water;

(2) arranging said treated reinforcing material in a desired shape;

(3) placing the thus arranged reinforcing material in a mold;

(4) pouring a molten ω-lactam composition containing a polymerization catalyst and an initiator into said mold; and (5) heating the molten ω-lactam composition to obtain a polyamide resin, thereby forming said molded article.

2. A molded article according to claim 1, wherein the intrinsic viscosity (η) of said polyamide resin is at least 1.8.

3. A molded article according to claim 2, wherein said polyamide resin contains 10 to 80% by weight of reinforcing material.

4. A molded article according to claim 3, wherein said reinforcing material is at least one member selected from the group consisting of carbon fiber, glass fiber, alumina fiber, silicon carbide fiber, steel wire and amorphous metal fiber.

5. A molded article according to claim 1, wherein said polyamide resin contains 10 to 80% by weight of reinforcing material.

6. A molded article according to claim 5, wherein said reinforcing material is at least one member selected from the group consisting of carbon fiber, glass fiber, alumina fiber, silicon carbide fiber, steel wire and amorphous metal fiber.

7. A molded article according to claim 1, wherein said molded article is a bar.

8. A molded article according to claim 7, wherein the intrinsic viscosity (η) of said polyamide resin is at least 1.8.

9. A molded article according to claim 8, wherein said polyamide resin contains 10 to 80% by weight of reinforcing material.

10. A molded article according to claim 9, wherein said reinforcing material is at least one member selected from the group consisting of carbon fiber, glass fiber, alumina fiber, silicon carbide fiber, steel wire and amorphous metal fiber.

11. A molded article according to claim 1, wherein said molded article is a tennis racket.

12. A molded article according to claim 11, wherein the intrinsic viscosity (η) of said polyamide resin is at least 1.8.

13. A molded article according to claim 12, wherein said polyamide resin contains 10 to 80% by weight of reinforcing material.

14. A molded article according to claim 13, wherein said reinforcing material is at least one member selected from the group consisting of carbon fiber, glass fiber, alumina fiber, silicon carbide fiber, steel wire and amorphous metal fiber.

15. A molded article according to claim 1, wherein said reinforcing material is at least one member selected from the group consisting of carbon fiber, glass fiber, alumina fiber, silicon carbide fiber, steel wire and amorphous metal fiber.

16. A molded article according to claim 1, wherein said reinforcing material is a braided material.

17. A molded article according to claim 1, wherein said reinforcing material is a cloth.

18. A molded article according to claim 1, wherein said reinforcing material is a sleeve.

19. A molded article according to claim 1, wherein said reinforcing material is a roving.

20. A molded article according to claim 1, wherein said reinforcing material is wound around a mandrel which is placed in said mold.

* * * * *